J. RADDIN.
Vehicle-Wheel.

No. 200,088.  Patented Feb. 5, 1878.

WITNESSES:
Jas. C. Hutchinson
Henry C. Hazard

INVENTOR.
John Raddin, by
Prindle & Co, his Att'ys

UNITED STATES PATENT OFFICE.

JOHN RADDIN, OF LYNN, MASSACHUSETTS.

IMPROVEMENT IN VEHICLE-WHEELS.

Specification forming part of Letters Patent No. 200,088, dated February 5, 1878; application filed December 26, 1877.

*To all whom it may concern:*

Be it known that I, JOHN RADDIN, of Lynn, in the county of Essex, State of Massachusetts, have invented certain new and useful Improvements in Carriage-Wheels; and do hereby declare that the following is a full, clear, and exact description thereof, reference being had to the accompanying drawing, making a part of this specification, in which—

Figure 1:
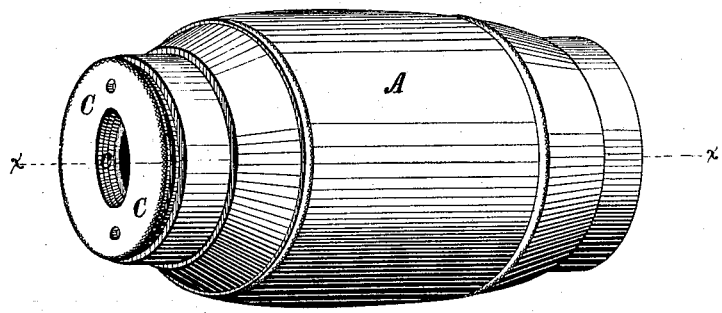
Figure 2:
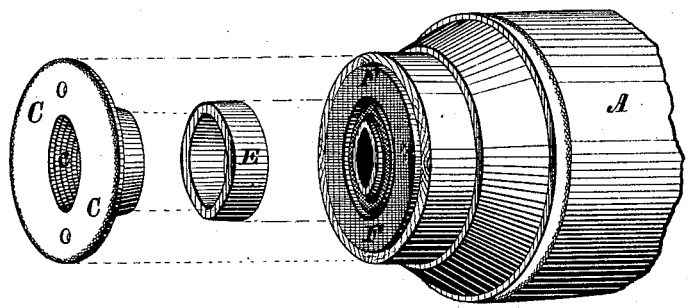
Figure 3:
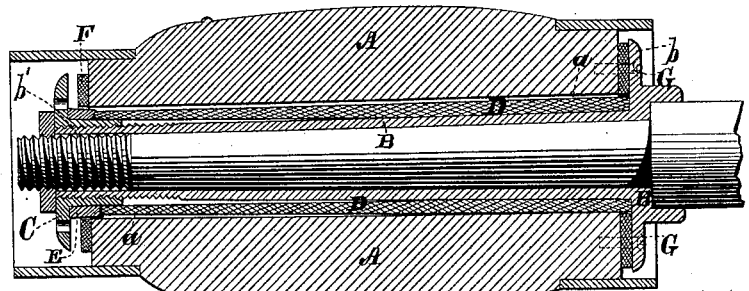

Figure 1 is a perspective view of my hub with its box secured in place. Fig. 2 is a like view of the same with the binding-nut and washer detached, and Fig. 3 is a central longitudinal section upon line $x\ x$ of Fig. 1.

Letters of like name and kind refer to like parts in each of the figures.

The design of my invention is to enable an axle-box to be secured within its hub with a yielding pressure, so as to cushion said wheel upon its axle; to which end it consists in the means employed for confining the elastic cushion in place between the box and hub, and for expanding said cushion radially, substantially as and for the purpose hereinafter specified.

In the annexed drawing, A represents a wheel-hub of usual form, in and through which extends an axial opening, $a$, that has somewhat larger diameter than would be required for the reception of an ordinary box.

Passing through the opening $a$ of the hub A is a metal box, B, which has such external dimensions as to cause a space to be left between its periphery and the interior of said opening that has, preferably, about one-fourth of an inch radial dimensions.

At one end of the box B is provided a radial flange, $b$, which extends outward over the contiguous end of the hub A, while at its opposite end said box is threaded exteriorly for about one inch, and upon such threaded portion $b'$ is fitted a flange-nut, C, which has the form shown in Fig. 2, its outer end being the same as said flange $b$, while its inner interiorly-threaded portion $c$ is tapered and decreases regularly in diameter from its outer end to its inner end.

Upon the box B, between its flange $b$ and its threaded portion $b'$, is fitted a tube of elastic material, D, which has a length about equal to the length of the hub A, and has such diameter as to enable it to be easily pressed into the opening $a$ of said hub, when, by longitudinal compression, said tube may be caused to expand radially, so as to closely fill said opening.

The longitudinal compression of the tube D is produced by screwing the flange-nut C inward upon the box B; but if said nut was permitted to bear directly upon the elastic material great difficulty would be experienced in rotating said nut so as to secure the required compression, as said elastic material would adhere to and resist the movement of the same. To avoid such difficulty, I place around the threaded tapered portion of the flanged nut C a washer, E, which loosely embraces the outer end of said tapered part, and has its outer end in contact with the inner face of the flange part of said nut.

The inner end of the washer E is, preferably, made concave radially, so as to enable it to fit over and confine the contiguous end of the tube D, and prevent the latter from spreading.

If, now, the flange-nut C is screwed inward, its movements are unobstructed, as the washer E is interposed between said nut and the tube D, and the bearing of said nut is wholly upon metal, in consequence of which the latter may be freely screwed inward until its flange bears upon or against the outer end of the hub A.

By varying the length of the tube D, any desired degree of radial pressure may be secured, the flange-nut being always screwed inward against the end of the hub.

In order that an elastic bearing may be provided for the flanges at the ends of the box B, a washer, F, of elastic material, is interposed between each flange and the end of the hub. This arrangement causes the hub to be cushioned against end thrust, and also prevents oil or dirt from passing into and injuring the tube D.

The box B is prevented from rotating within the hub A by means of screws G, two or more of which screws are passed through the flange $b$ of said box, and have their ends contained within said hub.

Having thus fully set forth the nature and merits of my invention, what I claim as new is—

In combination with the hub A, provided with the axial opening $a$, and with the elastic tube D fitted within said opening, the box B, having at one end a flange, $b$, and at its opposite end a threaded portion, $b'$, the flanged nut C fitted over said threaded portion $b'$, and the washer E fitted around said nut and bearing against the end of said tube D, said parts being arranged so that the inward movement of said nut shall compress said elastic tube longitudinally and expand the same radially, and thus confine said box firmly within said hub, substantially as specified.

In testimony that I claim the foregoing I have hereunto set my hand this 22d day of December, 1877.

JOHN RADDIN.

Witnesses:
F. F. RAYMOND, 2d.
A. J. OETTINGER.